(12) United States Patent  
Rosenberger

(10) Patent No.: US 8,297,258 B2  
(45) Date of Patent: Oct. 30, 2012

(54) METHOD AND DEVICE FOR OPERATING AN INTERNAL COMBUSTION ENGINE

(75) Inventor: Marcus Rosenberger, Schwieberdingen (DE)

(73) Assignee: Robert Bosch GmbH, Stuttgart (DE)

(*) Notice: Subject to any disclaimer, the term of this patent is extended or adjusted under 35 U.S.C. 154(b) by 102 days.

(21) Appl. No.: 12/924,159

(22) Filed: Sep. 21, 2010

(65) Prior Publication Data

US 2011/0079205 A1    Apr. 7, 2011

(30) Foreign Application Priority Data

Oct. 2, 2009   (DE) .......................... 10 2009 045 306

(51) Int. Cl.  
*F02D 41/22* (2006.01)

(52) U.S. Cl. ........ 123/481; 123/479; 123/443; 701/107; 701/112

(58) Field of Classification Search ................... 123/481, 123/198 F, 198 D, 198 DB, 479, 672, 443; 701/107, 112; 73/114.38, 114.45  
See application file for complete search history.

(56) References Cited

U.S. PATENT DOCUMENTS

| | | | |
|---|---|---|---|
| 5,611,314 A * | 3/1997 | Fuwa et al. | 123/491 |
| 5,644,913 A * | 7/1997 | Iwai et al. | 60/284 |
| 6,758,185 B2 * | 7/2004 | Surnilla et al. | 123/198 F |
| 6,769,398 B2 * | 8/2004 | Surnilla et al. | 123/339.19 |
| 7,069,903 B2 * | 7/2006 | Surnilla et al. | 123/339.19 |

* cited by examiner

*Primary Examiner* — Hai Huynh  
(74) *Attorney, Agent, or Firm* — Kenyon & Kenyon LLP

(57) ABSTRACT

A method for operating an internal combustion engine (2) having multiple cylinders (3); fuel may be injected into the multiple cylinders (3) via corresponding injectors, and air may be let in via corresponding intake valves (9) in order to form an air-fuel mixture in the cylinders (3) for providing a drive torque, and combustion exhaust gas may be discharged from the cylinders (3) via a catalytic converter (6); having the following steps: operating the internal combustion engine (2) in a first engine operating mode in which no fuel is injected into at least one first cylinder (3), so that the at least one first cylinder (3) does not contribute to the drive torque, and fuel is only injected into at least one second cylinder (3) in order to provide the drive torque; and switching to a second engine operating mode in which fuel is injected into the at least one first cylinder (3) and into the at least one second cylinder (3), so that the at least one first cylinder (3) and the at least one second cylinder (3) contribute to providing the drive torque; wherein in switching to the second engine operating mode the combustion is carried out using excess air in the at least one second cylinder (3), so that a portion of the air let into the at least one second cylinder (3), together with the combustion exhaust gas, passes into the catalytic converter (6).

23 Claims, 2 Drawing Sheets

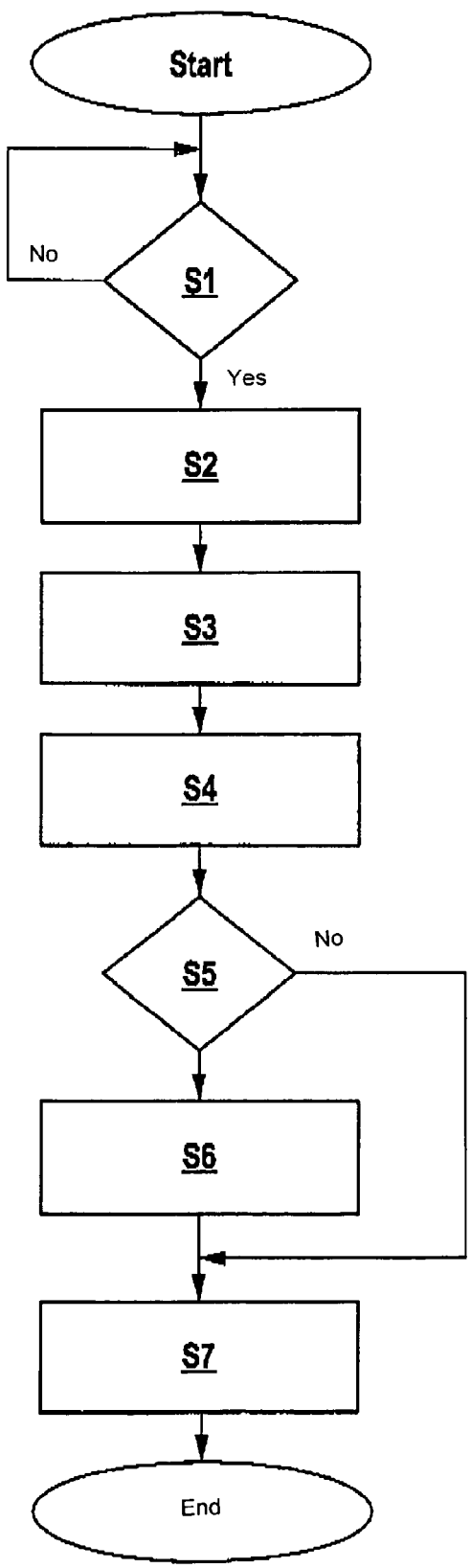

METHOD AND DEVICE FOR OPERATING AN INTERNAL COMBUSTION ENGINE

BACKGROUND OF THE INVENTION

1. Field of the Invention

The present invention relates to a method and a device for operating an internal combustion engine, in particular a method for operating an internal combustion engine in the transition from a partial engine operation to a full engine operation.

2. Description of Related Art

In internal combustion engines having direct injection, in particular spark ignition engines, in order to reduce the drive torque which is provided, the internal combustion engine may be operated in an operating mode in which a portion of the cylinders are switched off, i.e., operated in such a way that no combustion occurs therein, and therefore no drive torque is generated in these cylinders. Such an operating mode is referred to as "partial engine operation." The operating mode in which one-half of the cylinders are switched off is referred to as "half-engine operation."

When the internal combustion engine is operated in partial engine operation, for the affected switched-off cylinders the intake valves and exhaust valves for respectively supplying and discharging gases are closed, and the injection for these cylinders is suspended. The affected cylinders are switched off during the transition to partial engine operation, immediately after an air-fuel mixture has been combusted in the affected cylinder. After combustion the exhaust valve remains closed, so that the combustion exhaust gases present in the cylinder remain there. The internal combustion engine is driven by the cylinders which are active, i.e., not switched off, and provides a corresponding drive torque. This causes the pistons in the switched-off cylinders to be moved, so that the combustion exhaust gas present therein from the preceding combustion is successively compressed and expanded.

A switch is made between full engine operation, in which all cylinders are active, and partial engine operation, in which only a portion of the cylinders are active, as a function of an operating point, such as the load and/or the rotational speed, for example, and/or as a function of an external requirement, such as a driver input, which may be specified by a gas pedal position.

In direct fuel injection, fuel is injected directly into the combustion chamber with the aid of injectors. Even when the injectors are closed, leakage of fuel into the cylinder cannot be ruled out. For example, for conventional injectors leakage of up 2.5 mm$^3$ per minute is possible, and is not uncommon. When the internal combustion engine is operated in partial engine operation, fuel may enter the combustion chambers of the switched-off cylinders as the result of leakage into the switched-off cylinders. The enclosed combustion exhaust gas is thus enriched with uncombusted fuel. Since the partial engine operation may last for several minutes on average, the quantity of fuel which passes into the combustion chambers of the switched-off cylinders is not negligible. As soon as the internal combustion engine is switched from partial engine operation back to full engine operation, the combustion, exhaust gas which is enriched with fuel is discharged into the exhaust gas system of the internal combustion engine.

However, as the result of regulatory requirements, emission limits have been established for hydrocarbons emitted to the environment. These requirements apply for all operating modes, i.e., for full engine operation, partial engine operation, and also during the switchover phase between the two operating modes.

For internal combustion engines having direct fuel injection, a catalytic converter is usually used for exhaust gas enhancement for reducing the emissions of nitrogen oxides and carbon monoxide. Such a catalytic converter is able to store or release oxygen up to a certain degree. For a lean mixture, which results in combustion exhaust gases in which an air fraction is present, oxygen is stored in the catalytic converter. For a rich mixture, which results in combustion exhaust gas in which uncombusted hydrocarbon (HC) fractions are present, the catalytic converter releases the oxygen and oxidizes the uncombusted hydrocarbon fractions in the combustion exhaust gas.

SUMMARY OF THE INVENTION

The object of the present invention is to provide a method and a device for operating an internal combustion engine in partial engine operation, the fraction of uncombusted hydrocarbons in the combustion exhaust gas which is emitted to the environment when switching from partial engine operation to full engine operation being reduced or eliminated.

This object is achieved by the invention as follows.

According to a first aspect, a method is provided for operating an internal combustion engine having multiple cylinders; fuel may be injected into the multiple cylinders via corresponding injectors, and air may be let in via corresponding intake valves in order to form an air-fuel mixture in the cylinders for providing a drive torque, and combustion exhaust gas may be discharged from the cylinders via a catalytic converter. The method includes the following steps:

operating the internal combustion engine in a first engine operating mode in which no fuel is injected into at least one first cylinder, so that the at least one first cylinder does not contribute to the drive torque, and fuel is only injected into at least one second cylinder in order to provide the drive torque; and switching to a second engine operating mode in which fuel is injected into the at least one first cylinder and into the at least one second cylinder, so that the at least one first cylinder and the at least one second cylinder contribute to providing the drive torque;

in switching to the second engine operating mode, the combustion being carried out using excess air in the at least one second cylinder, so that a portion of the air let into the at least one second cylinder, together with the combustion exhaust gas, passes into the catalytic converter.

According to one specific embodiment, in switching to the second engine operating mode, combustion exhaust gas from the preceding combustion may be expelled from the at least one first cylinder, the combustion being carried out using excess air in the at least one second cylinder, so that the portion of air let into the at least one second cylinder together with the combustion exhaust gas passes from the at least one first cylinder and into the catalytic converter before or at the same time as the combustion exhaust gas from the preceding combustion.

According to one concept of the above method, before, during, and immediately after a switch from a first engine operating mode, in particular a partial engine operation, to a second engine operating mode, in particular a full engine operation, the consequences of leakage from a closed injector for the cylinder which is switched off in partial engine operation are compensated for by supplying atmospheric oxygen beforehand to the catalytic converter, where the atmospheric oxygen may be enriched. When the combustion exhaust gas which is enriched with leaked fuel is discharged into the exhaust gas section when the exhaust valve of the inactive cylinder is opened, the hydrocarbons in the combustion exhaust gas may be oxidized as they flow through the catalytic converter, and the hydrocarbon fractions in the exhaust gas are reduced or eliminated. Alternatively or additionally, the additional atmospheric oxygen may be supplied to the second cylinders in such a way that this atmospheric oxygen, simultaneously with the uncombusted leaked fuel from the first cylinders, reaches the catalytic converter, so that the leaked fuel may be oxidized there. The atmospheric oxygen is provided by operating the internal combustion engine in partial engine operation using a lean mixture, in which the air fraction is greater than that necessary for complete combustion of the injected fuel, before switching over to full engine operation.

Furthermore, the combustion may be carried out using excess air in the at least one second cylinder when a switchover condition for switching to the second engine operating mode is met.

According to one specific embodiment, a quantity of fuel which has penetrated into the at least one first cylinder as the result of leakage from the particular injectors into combustion chambers of the at least one first cylinder during a first engine operating mode may be determined, in particular with the aid of a leakage function which describes the quantity of fuel penetrating into the cylinders as a function of operating variables, in particular the rotational speed and/or a pressure in the fuel delivery system for the injector.

According to one specific embodiment, the quantity of fuel which has penetrated into the at least one first cylinder as the result of leakage from the particular injectors into combustion chambers of the at least one first cylinder during the first engine operating mode may be determined as a function of a leakage value which indicates the quantity of fuel which penetrates per unit of time.

In addition, a leaning period, during which the combustion is carried out using excess air in the at least one second cylinder, and an excess air rate may be selected as a function of the specified quantity of fuel.

It may be provided that the method includes the following additional steps:
  ascertaining a quantity of air stored in the catalytic converter, with the aid of a predefined catalytic converter function;
  operating the internal combustion engine using excess air before switching to the second engine operating mode; a leaning period, during which the combustion is carried out using excess air in the at least one second cylinder, and an excess air rate may be selected as a function of the quantity of air stored in the catalytic converter.

In particular, the quantity of air stored in the catalytic converter may be determined as a function of one or several of the following parameters: an exhaust gas mass flow through the catalytic converter, a lambda value upstream from the catalytic converter, a lambda value downstream from the catalytic converter, and a temperature of the catalytic converter.

According to a further aspect, a control unit is provided for operating an internal combustion engine having multiple cylinders; fuel may be injected into the multiple cylinders via corresponding injectors, and air may be let in via corresponding intake valves in order to form an air-fuel mixture in the cylinders for providing a drive torque, and combustion exhaust gas may be discharged from the cylinders via a catalytic converter, the control unit being designed to
  operate the internal combustion engine in a first engine operating mode in which no fuel is injected into at least one first cylinder, so that the at least one first cylinder does not contribute to the drive torque, and fuel is only injected into at least one second cylinder in order to provide the drive torque; and
  switch to a second engine operating mode in which fuel is injected into all cylinders, so that each of the cylinders contributes to providing the drive torque;
the control unit being further designed to carry out the combustion using excess air in the at least one second cylinder in switching to the second engine operating mode, so that a portion of the air let into the at least one second cylinder together with the combustion exhaust gas passes into the catalytic converter.

According to a further aspect, an engine system having the above control unit and an internal combustion engine having multiple cylinders is provided, each of the cylinders having an injector for injecting fuel into the multiple cylinders of the internal combustion engine and intake valves for letting air into the cylinders in order to form an air-fuel mixture in the cylinders for providing a drive torque, a catalytic converter being provided through which combustion exhaust gas from the cylinders is discharged.

BRIEF DESCRIPTION OF THE DRAWINGS

Preferred specific embodiments are explained in greater detail below with reference to the appended drawings.

FIG. 2 shows a flow diagram for elucidating the method for switching from partial engine operation to full engine operation.

DETAILED DESCRIPTION OF THE INVENTION

Figure 1:
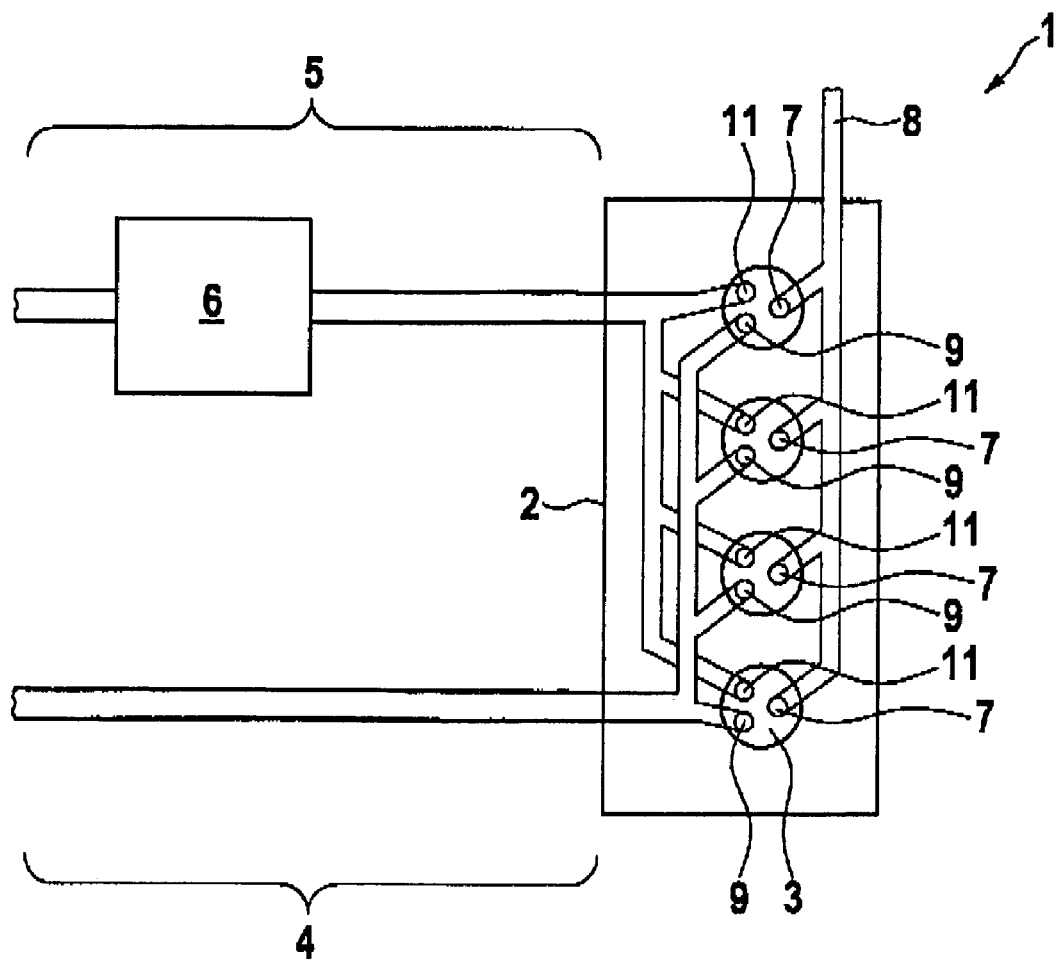
FIG. 1 schematically shows an illustration of an engine system in which the method for switching from partial engine operation to full engine operation may be carried out.

FIG. 1 illustrates an engine system 1 having an internal combustion engine 2. Internal combustion engine 2 is preferably a spark ignition engine having direct fuel injection. In the exemplary embodiment illustrated, internal combustion engine 2 includes four cylinders 3. Fuel is injected through injectors 7 into cylinders 3. Injectors 7 are connected to a fuel line 8 in which fuel is supplied to each of cylinders 3.

Air is supplied to cylinders 3 via an air supply section 4. An intake valve 9 is provided for each of cylinders 3 for letting air into each of cylinders 3. The combustion exhaust gas is expelled from cylinder 3 via exhaust valves 11 and discharged via an exhaust gas discharge section 5. A catalytic converter 6 is provided in exhaust gas discharge section 5 which is able to convert carbon monoxide and nitrogen oxides, among other substances.

A control unit 10 is also provided which is connected to actuators of internal combustion engine 2 in air supply section 4 and in exhaust gas discharge section 5 in order to suitably control these actuators for operating internal combustion engine 2. Specifically, control unit 10 controls injectors 7, intake valves 9, exhaust valves 11, and further actuators, i.e., control elements, of the engine system. Also provided in engine system 1 are suitable sensors, for example a lambda sensor, one or multiple temperature sensors, pressure sensors, and the like, for detecting engine states so that internal combustion engine 2 may be operated regardless of the prevailing engine state.

Control unit 10 controls internal combustion engine 2 in order to provide a drive torque. For this purpose, control unit 10 receives external request signals E, for example a driver input torque, a gas pedal position, and the like, via which a drive torque request may be externally specified. Control unit 10 also receives appropriate information from the sensors concerning engine states, for example the rotational speed, pressures, and temperatures in air supply section 4 and/or in exhaust gas discharge section 5.

In normal operation, all cylinders 3 of internal combustion engine 2 are active and are operated according to the four-stroke principle. That is, a sequence of strokes is carried out in each of cylinders 3. Each of cylinders 3 cyclically completes a sequence of a compression stroke in which the air-fuel mixture in cylinder 3 is compressed by a motion of a piston in cylinder 3, a combustion stroke in which the combustion occurs in cylinder 3 and the combustion chamber expands due to a motion of the piston in cylinder 3, an exhaust stroke in which combustion exhaust gases are expelled from cylinder 3 into exhaust gas discharge section 5, and an intake stroke during which air is drawn into cylinder 3 via air supply section 4. Cylinders 3 carry out these strokes in a staggered manner.

Depending on the intended operating state, for example specification of a driver input torque or operating state of internal combustion engine 2 such as idle mode, for example, control unit 10 is able to decide that the drive torque should be provided by only a portion of cylinders 3. In this case a first group of cylinders is switched off, and the entire drive torque is provided by a second group of active cylinders. When one-half of cylinders 3 are switched off, this is referred to as half-engine operation. Half-engine operation represents the standard for partial engine operation, since it subjects the mechanical system of internal combustion engine 2 to the least stress.

When cylinders 3 of the first group are switched off, after the preceding combustion has been carried out in one of these cylinders 3, affected exhaust valve 11 is not opened and therefore the combustion exhaust gases remain in affected cylinder 3. The drive torque, which is provided by the second group of cylinders 3 which are still active, moves the pistons in cylinders 3 of the first group so that the combustion exhaust gas is compressed and expanded there. The drive torque of active cylinders 3 of the second group is selected in such a way that the requested drive torque of internal combustion engine 2, including the torque losses of switched-off cylinders 3 of the first group, is generated.

When the operating conditions or the specification of the driver input torque change, control unit 10 is able to determine that a switch should then be made from partial engine operation back to full engine operation. For this purpose, one or multiple cylinders 3 of the first group is/are placed back in operation by first discharging the combustion exhaust gas via exhaust valves 11 of affected cylinders 3, and with the next expansion motion of a piston in the combustion chamber of affected cylinders 3, drawing air into the previously inactive cylinder 3, so that in the next stroke a drive torque is again provided by affected cylinder 3 by injection of fuel, compression of the air-fuel mixture in cylinder 3, and ignition of the air-fuel mixture.

During partial engine operation, fuel may also pass into switched-off cylinders 3 as the result of leakage from injectors 7 in the closed state, so that the fuel which penetrates into the combustion chamber mixes with the combustion exhaust gas and increases the hydrocarbon fraction there. Typical leakage values are up to 2.5 mm$^3$ per minute when injector 7 is completely closed. These values are not critical for active cylinders 3 of internal combustion engine 2, since the quantity of fuel flowing into cylinders 3 during one work cycle is negligible, and the quality of the combustion exhaust gas is not significantly influenced. However, since in partial engine operation cylinders 3 of the first group are not active for a fairly long period of time of up to several minutes, the fuel which has penetrated due to the leakage from injector 7 may accumulate. When exhaust valve 11 is opened to resume operation of one or multiple (switched-off) cylinders 3 of the first group, this causes combustion exhaust gas to be discharged into exhaust gas discharge section 5, which is greatly enriched with hydrocarbons from the penetrated fuel. This impairs the quality of the emissions from internal combustion engine 2.

FIG. 2 illustrates a flow diagram for elucidating a method for switching from a partial engine operation to a full engine operation, in which the emission characteristics are improved over the previously described situation. This method may similarly be used in cases in which a switch is made to a further partial engine operation, and for this purpose a previously inactive cylinder is once again placed in operation.

In step S1 a check is made as to whether a switch should be made from a partial engine operation to a full engine operation. This may be carried out according to a switching condition which is a function of operating states of internal combustion engine 2 such as load and rotational speed, for example, and/or as a function of a specification of a driver input torque. If these parameters are within given operating ranges, a decision may be made that a switch should be made from a partial engine operation to a full engine operation.

If the conditions for switching to full engine operation are met (alternative: yes), the fuel oxygen stored in catalytic converter 6 is computed (step S2). The oxygen stored in catalytic converter 6 is generally computed with the aid of a predefined catalytic converter function, which may be specified in the form of a function equation and/or in the form of a catalytic converter characteristics map. The specified catalytic converter function may take into account a lambda value upstream from and a lambda value downstream from catalytic converter 6, an exhaust gas mass flow through catalytic converter 6, a temperature of catalytic converter 6, and other state variables. The lambda values of the exhaust gas may be ascertained with the aid of lambda sensors situated upstream and downstream from catalytic converter 6. The lambda values indicate whether the air-fuel mixture combusted in cylinders 3 is too rich or too lean, and therefore indicate the degree to which the air-fuel mixture contains excess air or excess fuel with respect to a stoichiometric equilibrium between air and fuel. With the aid of the applied catalytic converter function, information may then be computed concerning the oxygen stored in catalytic converter 6.

In step S3 a computation or estimation is made concerning the quantity of fuel that has penetrated into cylinders 3 of the first group due to leakage from injectors 7 and has mixed with the combustion exhaust gas present in the cylinders. This may be ascertained or estimated as a function of the period of time during which internal combustion engine 2 has been operated in partial engine operation. In addition, leakage values (quantity of fuel/unit of time) may be ascertained by measuring the leakage from injectors 7 used in internal combustion engine 2, so that the quantity of fuel which has penetrated into cylinders 3 of the first group may be obtained by multiplying the leakage value of affected injector 7 by the period of time of the partial engine operation. Other approaches are also possible for obtaining the quantity of fuel in the combustion exhaust gas, for example by using an applicable leakage function which may be represented with the aid of a characteristics map. The quantity of the oxygen required in catalytic converter 6 is also a function of the number of cylinders 3 in the first group, since this specifies the quantity of hydrocarbons passing into the combustion exhaust gas.

In step S4, it is then ascertained as a function of the quantity of oxygen stored in catalytic converter 6 and as a function of the ascertained quantity of fuel whether the oxygen content in catalytic converter 6 must be increased in order to completely oxidize the fuel in catalytic converter 6. In principle, the quantity of fuel flowing into catalytic converter 6 in switching to full engine operation and the quantity of stored oxygen must form a stoichiometric equilibrium. For spark ignition engines operated with gasoline, the stoichiometric equilibrium is 1:14.7, for example, so that the necessary quantity of oxygen may be unambiguously computed when the fuel content in the combustion exhaust gas which is expelled during the switchover is known.

If it is determined in step S5 that sufficient oxygen is not present in catalytic converter 6 with regard to the expected fuel content in the combustion exhaust gas during the switchover (alternative: yes), before, during, and immediately after switching to partial engine operation, cylinders 3 of the second group may be operated using a leaner air-fuel mixture (step S6) in which excess air is present. That is, air is delivered from air supply section 4 to exhaust gas section 5; i.e., a leaned air-fuel mixture is combusted in affected cylinders 3 of the second group. The degree of leaning corresponds to a variable which is suitable for supplying a given portion of oxygen, i.e., a given quantity of oxygen, to catalytic converter 6 so that the oxygen is stored by same. The time window in which this leaning is carried out is selected in such a way that, as long as additional uncombusted fuel passes into catalytic converter 6 due to resumption of operation, cylinders 3 of the second group are operated using a leaned air-fuel mixture.

If it is determined in step S5 that the oxygen stored in catalytic converter 6 is sufficient to compensate for a quantity of fuel, i.e., hydrocarbon, presumably present in cylinders 3 of the first group (alternative: no), no additional oxygen needs to be supplied to catalytic converter 6 before switching to full engine operation, and the air-fuel mixture need not be leaned.

In step S7 the switch to full engine operation is carried out by starting the work cycle in cylinders 3 of the first group. During the switch to full engine operation, exhaust gas is expelled from cylinders 3 of the first group, so that hydrocarbons flow through catalytic converter 6. These hydrocarbons combine with the oxygen stored therein, and are thus oxidized.

Alternatively, in other specific embodiments it may be provided that as much oxygen as possible is stored in the catalytic converter. This may be carried out when the leakage value for penetration of fuel into cylinders 3 when injectors 7 are closed is not known. For this purpose, for example before switching to full engine operation, the air-fuel mixture may be provided with a maximum or predefined leaning for a given period of time in order to increase the quantity of oxygen stored in catalytic converter 6.

The leaning of the air-fuel mixture from step S6 may be discontinued immediately after switching from partial engine operation to full engine operation. Alternatively, the leaning may be discontinued after a given number of crankshaft revolutions or ignitions.

Since the quantity of oxygen required for oxidizing the hydrocarbons in the combustion exhaust gas is not known, in principle the degree of the leaning and the leaning period during which internal combustion engine 2 is operated using a leaned air-fuel mixture before switching to full engine operation may also be made a direct function of the length of time internal combustion engine 2 has been operated in partial engine operation. That is, the degree of leaning and/or the duration of leaning before switching to full engine operation may be directly ascertained with the aid of a suitable function based on the period of time during which internal combustion engine 2 has been operated in partial engine operation, and based on the number of cylinders 3 which are switched off and are then to be placed back in operation.

If it is determined in step S5 that catalytic converter 6 still has too little oxygen stored, so that the leaning is not sufficient, it may be provided that the switch from partial engine operation to full engine operation is delayed until catalytic converter 6 has stored sufficient oxygen.

As mentioned above, a switch may be made to a further partial engine operation instead of the previously described partial engine operation. For the above method it is important that after the switchover a previously switched-off cylinder is again active, i.e., contributes to providing the drive torque. It is irrelevant whether the number of active cylinders before the switchover is greater, equal to, or less than the number of active cylinders after the switchover.

What is claimed is:

1. A method for operating an internal combustion engine having multiple cylinders, fuel being injectable into the multiple cylinders via corresponding injectors, corresponding intake valves allowing entry of air in order to form an air-fuel mixture in the cylinders for providing a drive torque, and combustion exhaust gas being dischargeable from the cylinders via a catalytic converter, the method comprising:
   operating the internal combustion engine in a first engine operating mode in which no fuel is injected into at least one first cylinder, so that the at least one first cylinder does not contribute to the drive torque, and fuel is only injected into at least one second cylinder in order to provide a drive torque;
   switching to a second engine operating mode in which fuel is injected into the at least one first cylinder and into the at least one second cylinder, so that the at least one first cylinder and the at least one second cylinder contribute to providing the drive torque; and
   determining a quantity of fuel which has penetrated into the at least one first cylinder as a result of leakage from corresponding injectors into combustion chambers of the at least one first cylinder during a first engine operating mode, the quantity being determined as a function of at least one of a rotational speed and a pressure in the fuel delivery system for at least one injector;
   wherein in switching to the second engine operating mode the combustion is carried out using excess air in the at least one second cylinder, so that a portion of the air let into the at least one second cylinder, together with the combustion exhaust gas, passes into the catalytic converter.

2. The method as recited in claim 1, wherein in switching to the second engine operating mode, combustion exhaust gas from the preceding combustion may be expelled from the at least one first cylinder, the combustion being carried out using excess air in the at least one second cylinder, so that the portion of air let into the at least one second cylinder together with the combustion exhaust gas passes from the at least one first cylinder and into the catalytic converter before or at the same time as the combustion exhaust gas from the preceding combustion.

3. The method as recited in claim 2, wherein the combustion is carried out using excess air in the at least one second cylinder when a switchover condition for switching to the second engine operating mode is met.

4. The method as recited in claim 2, wherein the quantity of fuel which has penetrated into the at least one first cylinder as the result of leakage from the particular injectors into combustion chambers of the at least one first cylinder during the first engine operating mode is determined as a function of a leakage value which indicates the quantity of fuel which penetrates per unit of time.

5. The method as recited in claim 1, wherein the combustion is carried out using excess air in the at least one second cylinder when a switchover condition for switching to the second engine operating mode is met.

6. The method as recited in claim 5, wherein the quantity of fuel which has penetrated into the at least one first cylinder as the result of leakage from the particular injectors into combustion chambers of the at least one first cylinder during the first engine operating mode is determined as a function of a leakage value which indicates the quantity of fuel which penetrates per unit of time.

7. The method as recited in claim 1, wherein the quantity of fuel which has penetrated into the at least one first cylinder as the result of leakage from the particular injectors into combustion chambers of the at least one first cylinder during the first engine operating mode is determined as a function of a leakage value which indicates the quantity of fuel which penetrates per unit of time.

8. The method as recited in claim 7, wherein a leaning period, during which the combustion is carried out using excess air in the at least one second cylinder and an excess air rate is selected as a function of the specified quantity of fuel.

9. The method as recited in claim 7, further comprising:
ascertaining a quantity of air stored in the catalytic converter, with the aid of a predefined catalytic converter function;
operating the internal combustion engine using excess air before switching to the second engine operating mode, a leaning period, during which the combustion being carried out using excess air in the at least one second cylinder and an excess air rate being selected as a function of the quantity of air stored in the catalytic converter.

10. The method as recited in claim 9, wherein the quantity of air stored in the catalytic converter is determined as a function of at least one of the following parameters: an exhaust gas mass flow through the catalytic converter, a lambda value upstream from the catalytic converter, a lambda value downstream from the catalytic converter, and a temperature of the catalytic converter.

11. The method as recited in claim 1, wherein a leaning period, during which the combustion is carried out using excess air in the at least one second cylinder and an excess air rate is selected as a function of the specified quantity of fuel.

12. The method as recited in claim 11, further comprising:
ascertaining a quantity of air stored in the catalytic converter, with the aid of a predefined catalytic converter function;
operating the internal combustion engine using excess air before switching to the second engine operating mode, a leaning period, during which the combustion being carried out using excess air in the at least one second cylinder and an excess air rate being selected as a function of the quantity of air stored in the catalytic converter.

13. The method as recited in claim 12, wherein the quantity of air stored in the catalytic converter is determined as a function of at least one of the following parameters: an exhaust gas mass flow through the catalytic converter, a lambda value upstream from the catalytic converter, a lambda value downstream from the catalytic converter, and a temperature of the catalytic converter.

14. The method as recited in claim 1, further comprising:
ascertaining a quantity of air stored in the catalytic converter, with the aid of a predefined catalytic converter function;
operating the internal combustion engine using excess air before switching to the second engine operating mode, a leaning period, during which the combustion being carried out using excess air in the at least one second cylinder and an excess air rate being selected as a function of the quantity of air stored in the catalytic converter.

15. The method as recited in claim 14, wherein the quantity of air stored in the catalytic converter is determined as a function of at least one of the following parameters:
an exhaust gas mass flow through the catalytic converter, a lambda value upstream from the catalytic converter, a lambda value downstream from the catalytic converter, and a temperature of the catalytic converter.

16. A device for operating an internal combustion engine having multiple cylinders, fuel being injectable into the multiple cylinders via corresponding injectors, corresponding intake valves allowing entry of air in order to form an air-fuel mixture in the cylinders for providing a drive torque, and combustion exhaust gas being dischargeable from the cylinders via a catalytic converter, the device comprising:
a control unit configured to:
operate the internal combustion engine in a first engine operating mode in which no fuel is injected into at least one first cylinder, so that the at least one first cylinder does not contribute to the drive torque, and fuel is only injected into at least one second cylinder in order to provide the drive torque;
switch to a second engine operating mode in which fuel is injected into all cylinders, so that each of the cylinders contributes to providing the drive torque;
cause the combustion using excess air in the at least one second cylinder in switching to the second engine operating mode, so that a portion of the air let into the at least one second cylinder together with the combustion exhaust gas passes into the catalytic converter; and
determine a quantity of fuel which has penetrated into the at least one first cylinder as a result of leakage from corresponding injectors into combustion chambers of the at least one first cylinder during the first engine operating mode, the quantity being determined as a function of at least one of the rotational speed and a pressure in the fuel delivery system for at least one injector.

17. The device as recited in claim 16, wherein, in switching to the second engine operating mode, combustion exhaust gas from the preceding combustion may be expelled from the at least one first cylinder, the combustion being carried out using excess air in the at least one second cylinder, so that the portion of air let into the at least one second cylinder together with the combustion exhaust gas passes from the at least one first cylinder and into the catalytic converter before or at the same time as the combustion exhaust gas from the preceding combustion.

18. The device as recited in claim 16, wherein the combustion is carried out using excess air in the at least one second cylinder when a switchover condition for switching to the second engine operating mode is met.

19. The device as recited in claim 16, wherein the quantity of fuel which has penetrated into the at least one first cylinder as the result of leakage from the particular injectors into combustion chambers of the at least one first cylinder during the first engine operating mode is determined as a function of a leakage value which indicates the quantity of fuel which penetrates per unit of time.

20. The device as recited in claim 16, wherein a leaning period, during which the combustion is carried out using excess air in the at least one second cylinder and an excess air rate is selected as a function of the specified quantity of fuel.

21. The device as recited in claim 16, wherein a quantity of air stored in the catalytic converter is determined with the aid of a predefined catalytic converter function and the internal combustion engine is operated using excess air before switching to the second engine operating mode, a leaning period, during which the combustion being carried out using excess air in the at least one second cylinder and an excess air rate being selected as a function of the quantity of air stored in the catalytic converter.

22. The device as recited in claim 21, wherein the quantity of air stored in the catalytic converter is determined as a function of at least one of the following parameters: an exhaust gas mass flow through the catalytic converter, a lambda value upstream from the catalytic converter, a lambda value downstream from the catalytic converter, and a temperature of the catalytic converter.

23. An engine system comprising:
- an internal combustion engine having multiple cylinders, wherein each of the cylinders includes an injector for injecting fuel into the multiple cylinders of the internal combustion engine, and intake valves for letting air into the cylinders in order to form an air-fuel mixture in the cylinders for providing a drive torque, a catalytic converter being provided through which combustion exhaust gas from the cylinders is discharged; and
- a control unit configured to:
    - operate the internal combustion engine in a first engine operating mode in which no fuel is injected into at least one first cylinder, so that the at least one first cylinder does not contribute to the drive torque, and fuel is only injected into at least one second cylinder in order to provide the drive torque;
    - switch to a second engine operating mode in which fuel is injected into all cylinders, so that each of the cylinders contributes to providing the drive torque;
    - cause the combustion using excess air in the at least one second cylinder in switching to the second engine operating mode, so that a portion of the air let into the at least one second cylinder together with the combustion exhaust gas passes into the catalytic converter; and
    - determine a quantity of fuel which has penetrated into the at least one first cylinder as a result of leakage from corresponding injectors into combustion chambers of the at least one first cylinder during the first engine operating mode, the quantity being determined as a function of at least one of a rotational speed and a pressure in the fuel delivery system for at least one injector.

* * * * *